(12) United States Patent
Gao et al.

(10) Patent No.: US 11,818,330 B2
(45) Date of Patent: Nov. 14, 2023

(54) DISPLAY DEVICE AND DRIVING METHOD THEREOF

(71) Applicant: BOE TECHNOLOGY GROUP CO., LTD., Beijing (CN)

(72) Inventors: Jian Gao, Beijing (CN); Xue Dong, Beijing (CN); Xiaochuan Chen, Beijing (CN); Tao Hong, Beijing (CN); Ming Zhu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 528 days.

(21) Appl. No.: 16/981,768

(22) PCT Filed: Nov. 29, 2019

(86) PCT No.: PCT/CN2019/121966
§ 371 (c)(1),
(2) Date: Sep. 17, 2020

(87) PCT Pub. No.: WO2021/102909
PCT Pub. Date: Jun. 3, 2021

(65) Prior Publication Data
US 2023/0094018 A1  Mar. 30, 2023

(51) Int. Cl.
*H04N 13/302* (2018.01)
*H04N 13/383* (2018.01)
(Continued)

(52) U.S. Cl.
CPC ........... *H04N 13/302* (2018.05); *G09G 3/002* (2013.01); *G09G 3/3607* (2013.01); *G09G 5/14* (2013.01); *H04N 13/383* (2018.05)

(58) Field of Classification Search
CPC .... H04N 13/302; H04N 13/383; G09G 3/002; G09G 3/3607; G09G 5/14
(Continued)

(56) References Cited

U.S. PATENT DOCUMENTS 5,493,427 A     2/1996 Nomura et al.
2016/0054573 A1  2/2016 Kasano et al.
(Continued)

FOREIGN PATENT DOCUMENTS

CN  103792753 A   5/2014
CN  104035203 A   9/2014
(Continued)

OTHER PUBLICATIONS

European Patent Office, Extended European Search Report, dated Oct. 10, 2022, application No. EP19945394.5.

*Primary Examiner* — Gims S Philippe
(74) *Attorney, Agent, or Firm* — HOUTTEMAN LAW LLC (57) ABSTRACT

A display device provided by the present disclosure includes: a plurality of display units arranged in an array, wherein each display unit includes m sub-pixels, the m sub-pixels of the display unit are in one-to-one correspondence with m preset viewing areas, and m is an integer greater than or equal to 2; and refraction structures in one-to-one correspondence with the plurality of display units, wherein each refraction structure is located on a light emitting side of a display unit corresponding to the refraction structure, and the refraction structure is configured to refract light emitted from each sub-pixel of a corresponding display unit to a viewing area corresponding to the sub-pixel.

16 Claims, 7 Drawing Sheets

Driving a sub-pixel corresponding to a left-eye viewing area in each display unit to display a left-eye image, and driving a sub-pixel corresponding to a right-eye viewing area in each display unit to display a right-eye image — S201

(51) Int. Cl.
*G09G 3/00* (2006.01)
*G09G 3/36* (2006.01)
*G09G 5/14* (2006.01)

(58) Field of Classification Search
USPC .......................................................... 348/51
See application file for complete search history.

(56) References Cited

U.S. PATENT DOCUMENTS

| | | | |
|---|---|---|---|
| 2017/0256750 A1* | 9/2017 | Zhang | H10K 71/00 |
| 2017/0270868 A1* | 9/2017 | Li | G09G 3/2003 |
| 2018/0059426 A1* | 3/2018 | Lu | G09G 3/30 |
| 2019/0124324 A1* | 4/2019 | Allio | H04N 13/31 |
| 2019/0139472 A1 | 5/2019 | Liu | |
| 2021/0173264 A1* | 6/2021 | Niu | G02F 1/133602 |
| 2021/0335299 A1* | 10/2021 | Shan | G09G 3/3614 |
| 2022/0383787 A1* | 12/2022 | Meng | G09G 3/3614 |

FOREIGN PATENT DOCUMENTS

| | | |
|---|---|---|
| CN | 104155824 A | 11/2014 |
| CN | 105446050 A | 3/2016 |
| CN | 105933697 A | 9/2016 |

\* cited by examiner

Driving a sub-pixel corresponding to a left-eye viewing area in each display unit to display a left-eye image, and driving a sub-pixel corresponding to a right-eye viewing area in each display unit to display a right-eye image ⸺ S201

DISPLAY DEVICE AND DRIVING METHOD THEREOF

CROSS REFERENCE TO RELATED APPLICATIONS

This is a National Phase Application filed under 35 U.S.C. 371 as a national stage of PCT/CN2019/121966, filed on Nov. 29, 2019, the contents of which are incorporated herein by reference in the entirety.

TECHNICAL FIELD

The present disclosure relates to the field of naked-eye 3D display technology, and more particularly, to a display device and a driving method thereof.

BACKGROUND

In order to achieve naked-eye 3D (three-dimensional) display (i.e., stereoscopic display), a display area of a display panel may be divided into a left-eye display area and a right-eye display area. For example, columns of pixels are the left-eye display area and the right-eye display area alternately; then, each left-eye display area displays a left-eye image, each right-eye display area displays a right-eye image, and a grating is set outside the display panel. The grating is able to refract light from each left-eye display area to one viewing area (e.g., a left-eye viewing area), and refract light from each right-eye display area to another viewing area (e.g., a right-eye viewing area). Therefore, when a user's eyes are in the two viewing areas, respectively, they can see the desired left-eye image and right-eye image, respectively, and feel a stereoscopic effect.

According to the above naked-eye 3D display technology, only two viewing areas can be formed. Therefore, the user's eyes must be located at two specific positions (i.e., in the two viewing areas) to feel the stereoscopic effect. The viewing angle and position are greatly restricted, and the viewing freedom is poor.

SUMMARY

Embodiments of the present disclosure provide a display device and a driving method thereof.

According to a first aspect, embodiments of the present disclosure provide a display device, including: a plurality of display units arranged in an array; wherein each display unit includes m sub-pixels, the m sub-pixels of the display unit are in one-to-one correspondence with m preset viewing areas, and m is an integer greater than or equal to 2; and refraction structures in one-to-one correspondence with the plurality of display units; each refraction structure is located on a light emitting side of a display unit corresponding to the refraction structure, and the refraction structure is configured to refract light emitted from each sub-pixel of the corresponding display unit to a viewing area corresponding to the sub-pixel.

In some embodiments, the m sub-pixels of each display unit are arranged in an array, and sub-pixels of any two display units are arranged in a same way.

In some embodiments, the m sub-pixels of each display unit are arranged in an M×N matrix, where M is an integer greater than or equal to 2, and N is an integer greater than or equal to 2.

In some embodiments, orthographic projections of the viewing areas on a reference plane parallel to a light emitting surface of each sub-pixel are arranged in an array, and an arrangement of the orthographic projections is the same as an arrangement of the sub-pixels of each display unit.

In some embodiments, sub-pixels located at a same relative position in all of the plurality of display units correspond to a same viewing area.

In some embodiments, each refraction structure is equivalent to a plano-convex lens, and a plane side of the equivalent plano-convex lens is proximal to the display units; and light emitting surfaces of all sub-pixels of each display unit are located in a focal plane of the plano-convex lens equivalent to the refraction structure corresponding to the display unit.

In some embodiments, light emitting surfaces of all sub-pixels are located in a same plane.

In some embodiments, plane sides of all equivalent plano-convex lenses are located in a same plane.

In some embodiments, all equivalent plano-convex lenses have a same focal length.

In some embodiments, an orthographic projection of the display unit on a reference plane parallel to the light emitting surfaces of the sub-pixels is a display projection, orthographic projections of the sub-pixels on the reference plane are pixel projections, and an orthographic projection of the refraction structure on the reference plane is a refraction projection; a pattern formed by all display projections is symmetrical with respect to an X-axis and a Y-axis respectively, and the X-axis and the Y-axis are located in the reference plane and perpendicular to each other; a pattern formed by all refraction projections is symmetrical with respect to the X-axis and the Y-axis respectively; a pattern formed by all the pixel projections in the display projection is symmetrical with respect to a direction parallel to the X-axis and a direction parallel to the Y-axis respectively; except for a display projection whose geometric center is on the Y-axis, along a direction of the X-axis, geometric centers of other display projections are farther away from the Y-axis than geometric centers of their corresponding refraction projections; and except for a display projection whose geometric center is on the X-axis, along a direction of the Y-axis, geometric centers of other display projections are farther away from the X-axis than geometric centers of their corresponding refraction projections.

In some embodiments, the display projection is a rectangle having a first edge parallel to the X-axis and a second edge parallel to the Y-axis, and the respective display projections are arranged closely; the refraction projection is a rectangle having a third edge parallel to the X-axis and a fourth edge parallel to the Y-axis, and the respective refraction projections are arranged closely; and a length of the first edge of the display projection is greater than a length of a third edge of a refraction projection corresponding to the display projection, and a length of the second edge of the display projection is greater than a length of a fourth edge of the refraction projection corresponding to the display projection.

In some embodiments, the refraction structure is an optical plano-convex lens made of a transparent material, the optical plano-convex lens has a plane side and a convex arc side arranged oppositely, and the plane side is proximal to the display unit.

In some embodiments, the refraction structure is a diffractive plano-convex lens made of a transparent material, the diffractive plano-convex lens has a plane side and a diffractive structure side arranged oppositely, and the plane side is proximal to the display unit.

In some embodiments, the m sub-pixels of the same display unit have a same color; and all sub-pixels have at least two different colors.

In some embodiments, the sub-pixel includes a light emitting device.

In some embodiments, the display device further includes: a position detector configured to detect a position of a user's eye; and a controller configured to determine a viewing area where the user's eye is located according to the position of the user's eye, and control a sub-pixel corresponding to the viewing area of respective display unit to display.

According to a second aspect, embodiments of the present disclosure provide a driving method of the above display device, including: driving a sub-pixel corresponding to a left-eye viewing area in each of the plurality of display units to display a left-eye image, and driving a sub-pixel corresponding to a right-eye viewing area in the each of the plurality of display units to display a right-eye image; wherein the left-eye viewing area is a viewing area where a left eye of a user is located, and the right-eye viewing area is a viewing area where a right eye of the user is located.

BRIEF DESCRIPTION OF THE DRAWINGS

The accompanying drawings, which are provided for further understanding of the embodiments of the present disclosure and constitute a part of the specification, are used for explaining the present disclosure together with exemplary embodiments of the present disclosure, but do not constitute a limitation to the present disclosure. The above and other features and advantages will become more apparent to those skilled in the art by describing the exemplary embodiments in detail with reference to the accompanying drawings.

DETAILED DESCRIPTION

In order to enable those skilled in the art to better understand the technical solutions of the embodiments of the present disclosure, a display device and a driving method thereof provided by the embodiments of the present disclosure will be described in detail below with reference to the accompanying drawings.

Hereinafter, the embodiments of the present disclosure will be described more fully with reference to the accompanying drawings, but the illustrated embodiments may be embodied in different forms and should not be construed as being limited to the embodiments set forth in the present disclosure. Rather, the purpose of providing these embodiments is to make the present disclosure thorough and complete, and to enable those skilled in the art to fully understand the scope of the present disclosure.

The embodiments of the present disclosure may be described with reference to plan views and/or cross-sectional views with the help of ideal schematic diagrams of the present disclosure. However, the example illustrations may be modified according to manufacturing technology and/or tolerances.

In the case of no conflict, the embodiments of the present disclosure and the features in the embodiments may be combined with each other.

The terms used in the present disclosure are only used for describing specific embodiments, and are not intended to limit the present disclosure. The term "and/or" as used in this disclosure includes any and all combinations of one or more related listed items. The singular forms "a", "an" and "the" as used in this disclosure are also intended to include plural forms, unless the context clearly indicates otherwise. As used in the present disclosure, the terms "include" and "made of" designate the presence of the described features, wholes, steps, operations, elements and/or components, but do not exclude the presence or addition of one or more other features, wholes, steps, operations, elements, components and/or a group thereof.

Unless otherwise defined, the meanings of all terms (including technical and scientific terms) used in the present disclosure are the same as those commonly understood by those of ordinary skill in the art. It will also be understood that terms such as those defined in commonly used dictionaries should be interpreted as having meanings consistent with their meanings in the related art and the context of the present disclosure, and will not be interpreted as having idealized or excessive formal meanings unless the present disclosure clearly defines them as such.

The embodiments of the present disclosure are not limited to the embodiments shown in the drawings, but further include configuration modifications formed based on manufacturing processes. Therefore, the areas illustrated in the drawings have schematic properties, and the shapes of the areas shown in the figures illustrate the specific shapes of the areas of the elements, but are not intended to be limitative.

In the first aspect, referring to FIGS. 1 to 11, an embodiment of the present disclosure provides a display device.

The display device of the embodiment of the present disclosure can realize naked-eye 3D display, that is, a user can feel a stereoscopic effect by directly viewing the display device with naked eyes without wearing auxiliary equipment such as 3D glasses.

The display device of the embodiment of the present disclosure includes:

a plurality of display units 1 arranged in an array; wherein each display unit 1 includes m sub-pixels 11, the m sub-pixels 11 of each display unit 1 are in one-to-one correspondence with m preset viewing areas 8, and m is an integer greater than or equal to 2; and refraction structures 5 in one-to-one correspondence with the display units 1; each refraction structure 5 is located on a light emitting side of its corresponding display unit 1, and each refraction structure 5 is used for refracting light emitted from each sub-pixel 11 of its corresponding display unit 1 to a viewing area 8 corresponding to the sub-pixel 11.

Figure 1:
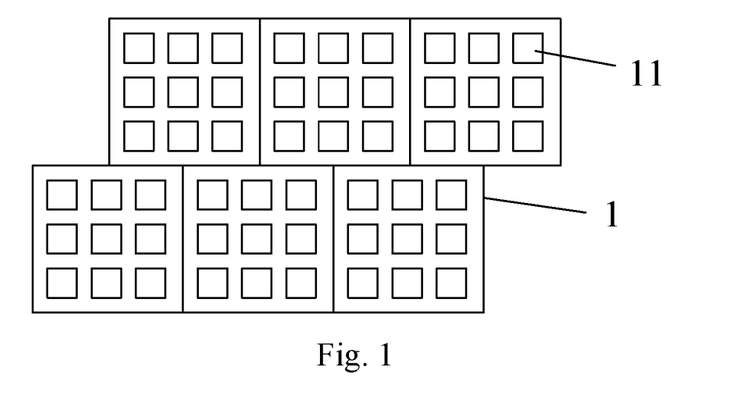
FIG. 1 is a top view of a structure of a part of display units in a display device according to an embodiment of the present disclosure (a refraction structure is not shown).

Referring to FIG. 1 (where the refraction structure is not shown), the display device of the embodiment of the present disclosure includes the plurality of display units 1 arranged in an array, and each display unit 1 includes a plurality of (m) sub-pixels 11.

It should be understood that a form of the array formed by the display units 1 may be various. For example, referring to FIG. 1, the display units 1 in different rows in an array are staggered by half of one display unit; alternatively, referring to FIG. 5, display units 1 are arranged in a standard "matrix" with multiple rows and multiple columns.

Here, each sub-pixel 11 is the smallest unit that can independently display, that is, each sub-pixel 11 can independently display required content. Therefore, each sub-pixel 11 should have an individually controllable driving structure. For example, the sub-pixels 11 can be driven by gate lines and data lines that are arranged crosswise, and each crossing position of the gate lines and the data lines defines one sub-pixel 11. Therefore, it can also be understood that every m sub-pixels 11 arranged together in position constitute one display unit 1.

Figure 4:
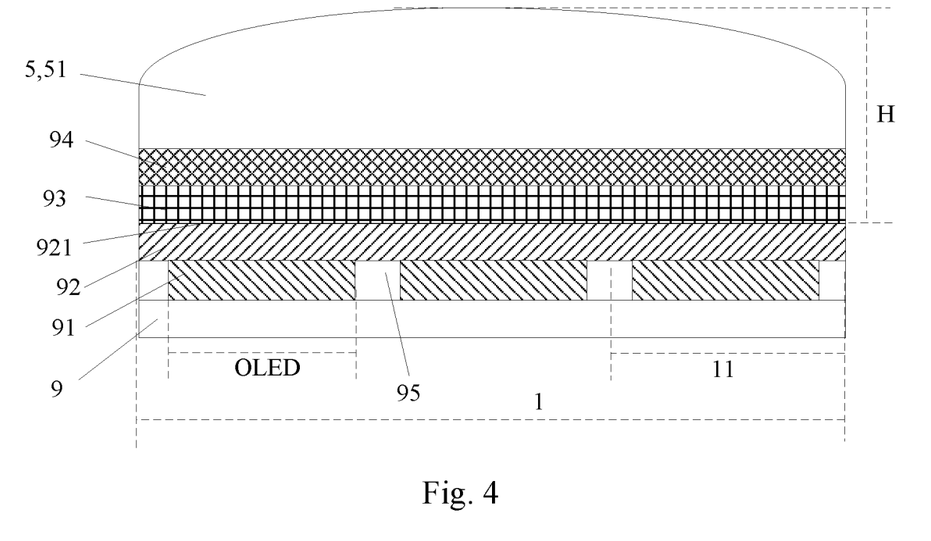
FIG. 4 is a partial cross-sectional view showing a structure of a display unit in another display device according to an embodiment of the present disclosure.

Referring to FIG. 4, the display device of the embodiment of the present disclosure is further provided with a corresponding refraction structure 5 on the light emitting side of each display unit 1, and the refraction structure 5 is used for refracting light emitted from each sub-pixel 11 of the display unit 1 to a corresponding viewing area 8.

Therefore, the display device of the embodiment of the present disclosure has m (i.e., the number of sub-pixels 11 in each display unit 1) viewing areas 8. When displaying is performed, light emitted from the m sub-pixels 11 in each display unit 1 is refracted to m viewing areas 8, respectively. Correspondingly, the light in each viewing area 8 comes from one respective sub-pixel 11 in each display unit 1.

Figure 2:
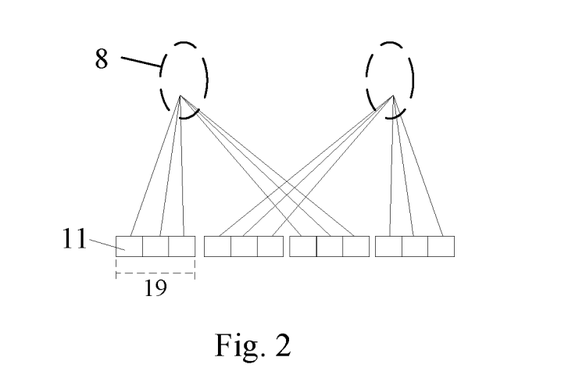
FIG. 2 is a schematic diagram of the correspondence between light emitted from a part of sub-pixels and viewing areas in some related technologies.

In some related technologies, referring to FIG. 2, a plurality of (for example, three) sub-pixels 11 arranged together in a display panel constitute a pixel 19, and the pixel 19 is visually a "display point". The light of different pixels 9 is then refracted by gratings or other structures to two viewing areas 8 (i.e., a left-eye viewing area and a right-eye viewing area), respectively; that is, the light emitted from the sub-pixels 11 that are arranged together and constitute a unit (i.e., one pixel 19) is directed in the same direction.

It can be seen that the related technologies can only form two viewing areas 8, and only when a user is located in a specific position to ensure that the user's eyes are located in the two viewing areas 8, respectively, the user can feel the stereo effect.

Figure 3:
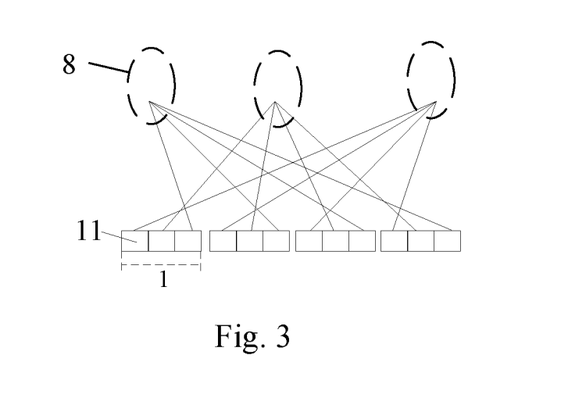
FIG. 3 is a schematic diagram of the correspondence between light emitted from a part of sub-pixels and viewing areas in another display device according to an embodiment of the present disclosure.

Referring to FIG. 3, in the embodiment of the present disclosure, the light emitted from m (for example, three) sub-pixels 11 in each display unit 1 is refracted to m viewing areas 8, respectively; that is, the light emitted from the sub-pixels 11 that are arranged together and constitute a unit (i.e., one display unit 1) is directed in different directions.

Therefore, the number of viewing areas 8 that can be formed in the embodiment of the present disclosure is equal to the number m of the sub-pixels 11 in each display unit 1, so that it can form more than two viewing areas 8, and as long as the user's eyes are in any two different viewing areas 8, respectively, the stereoscopic effect can be felt, and the naked-eye 3D display can be realized.

As a result, the user can move in a larger range when viewing information displayed on the display device of the embodiment of the present disclosure, and the viewing position is more flexible and freer.

Therefore, in some embodiments, m is greater than or equal to 3, so that the display device of the embodiment of the present disclosure may form at least three viewing areas 8.

Further, the above multiple viewing areas 8 may be arranged in an array; that is, there are multiple viewing areas 8 in at least two different directions. Therefore, when a line connected to the eyes of the user are in different directions, the eyes can always be in different viewing areas 8 to feel the three-dimensional effect (i.e., the stereoscopic effect). That is, the display device of the embodiment of the present disclosure can realize rotating viewing, such as 360-degree rotating viewing.

In addition, if the display device of the embodiment of the present disclosure has four or more viewing areas 8, there may be multiple users whose eyes are located in different viewing areas 8 at the same time; that is, the display device of the embodiment of the present disclosure can be watched by multiple users at the same time.

In summary, the display device of the embodiment of the present disclosure can greatly improve a viewing experience and a resolution felt by the user.

In some embodiments, the above plurality of display units 1 may be located in one display panel, or the sub-pixels 11 in the display panel may have the above arrangement.

In some embodiments, the above refraction structure 5 may be directly formed on a light emitting side of the above display panel by means of deposition or the like.

In other embodiments, all the refraction structures 5 may alternatively be formed in an independent plate-shaped device; that is, all refraction structures 5 may form an independent "refraction substrate", and by arranging the refraction substrate on the light emitting side of the above display panel, the display device of the embodiment of the present disclosure can also be obtained.

In some embodiments, referring to FIG. 4, each sub-pixel 11 includes a light emitting device. In some embodiments, the light emitting device may be an organic light emitting diode (OLED).

Specifically, each sub-pixel 11 can realize light emission and display through the light emitting device, and the light emitting device may further be an OLED; that is, the above display panel may be an organic light emitting diode display panel.

Referring to FIG. 4, the OLED may be arranged on a base substrate 9 and include an anode 91, a light emitting layer 92, and a cathode 93 that are stacked on each other; and on a side of the OLED far away from (i.e., distal to) the base substrate 9, there is also an encapsulation layer 94 and other structures. Moreover, in an actual OLED display panel, other structures such as gate lines, data lines, and pixel circuits may also be provided.

It should be understood that, in order to realize independent control of each sub-pixel 11, at least one of the cathodes 93 and the anodes 91 of different sub-pixels 11 should be independent of each other (in FIG. 4, independent anodes 91 are taken as an example). Moreover, adjacent sub-pixels 11 (including adjacent sub-pixels 11 in one display unit 1 and adjacent sub-pixels 11 in different display units 1) may be spaced apart from each other by a pixel defining layer (PDL) 95 or the like.

Of course, in order to arrange the pixel defining layer 95, gate lines, data lines and other structures, referring to FIG. 4, the OLED does not necessarily occupy the entire sub-pixel 11, but only corresponds to (e.g., occupies) a part of the sub-pixel 11 (i.e., the anode 91, the light emitting layer 92 and the cathode 93 are only overlapped in the part of the sub-pixel 11). Obviously, the part of the sub-pixel 11 corresponding to the OLED is an actual light emitting area of the sub-pixel 11.

Alternatively, other forms of the sub-pixel 11 are also feasible. For example, the above display panel may be a liquid crystal display panel.

Figure 11:
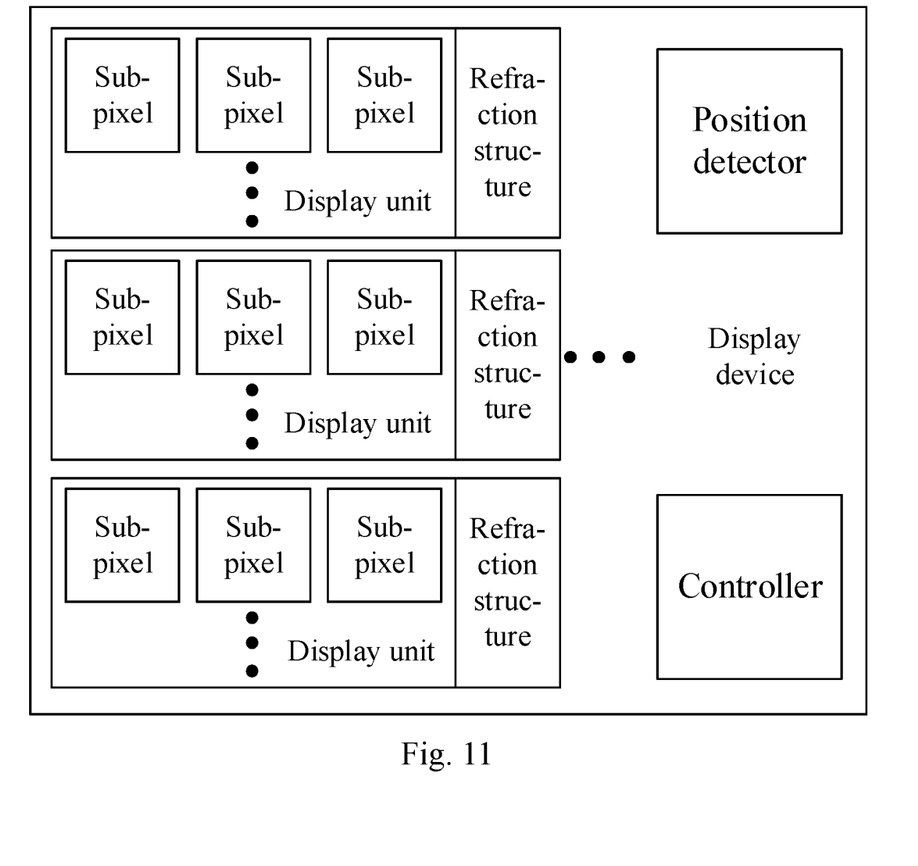
FIG. 11 is a block diagram showing components of another display device according to an embodiment of the present disclosure.

In some embodiments, referring to FIG. 11, the display device of the embodiment of the present disclosure further includes:

a position detector configured to detect a position of the user's eye; and a controller configured to determine a viewing area 8 where the user's eye is located according to the position of the user's eye, and control a sub-pixel 11, which corresponds to the viewing area 8, of respective display unit 1 to display.

The display device of the embodiment of the present disclosure has multiple viewing areas 8, and thus the user's eyes may be located in different viewing areas 8. Therefore, the position detector may be set to detect positions of the user's eyes in real time. For example, the position detector may be a camera provided in the above display panel, which can determine the positions of the user's eyes by collecting and analyzing the user's image.

Furthermore, after the positions of the user's eyes are determined, the controller (such as a processor) may calculate to determine the viewing areas 8 where the user's eyes are located, respectively, and control sub-pixels 11 corresponding to the viewing areas 8 to display a corresponding image so that the user feels the three-dimensional effect.

Therefore, the display device of the embodiment of the present disclosure can display according to an actual position of the user to obtain a better display effect. At the same time, the display device can also turn off sub-pixels corresponding to the viewing areas 8 that currently have no eyes of the user located therein to reduce the power consumption and the amount of computing for driving.

Alternatively, the display device of the embodiment of the present disclosure may not have the above position detector and controller. For example, multiple viewing positions may be specified in advance (i.e., the user may be required to watch at specific viewing positions), and when the user is at any one of the viewing positions, the left eye of the user must be in one of some viewing areas 8 and the right eye must be in one of other viewing areas 8, so as long as the above two viewing areas 8 directly display a left-eye image and a right-eye image, respectively, it can be ensured that the user feels the stereoscopic effect.

In some embodiments, the m sub-pixels 11 of each display unit 1 are arranged in an array, and sub-pixels 11 of any two display units 1 are arranged in a same way.

Referring to FIG. 1, in order to facilitate the design of the refraction structure 5, the sub-pixels 11 in each of the display units 1 may be arranged in an array in a same manner.

In some embodiments, the m sub-pixels 11 of each display unit 1 are arranged in an M×N matrix, wherein M is an integer greater than or equal to 2, and N is an integer greater than or equal to 2.

Further, referring to FIG. 1, the sub-pixels 11 in each display unit 1 may also be arranged in a standard "matrix" including multiple rows and multiple columns, the number of sub-pixels 11 in each row is at least 2, and the number of sub-pixels 11 in each column is also at least 2.

In some embodiments, orthographic projections of the viewing areas 8 on a reference plane parallel to a light emitting surface 921 of the sub-pixel 11 are arranged in an array, and an arrangement of the orthographic projections is the same as an arrangement of the sub-pixels 11 of the display unit 1.

Further, in a cross-section parallel to the light emitting surface 921 and at a certain distance from the light emitting surface 921, cutout patterns of the viewing areas 8 may also be arranged in an array, and the arrangement of the cutout patterns is the same as that of the sub-pixels 11 in the display unit 1.

For example, if the sub-pixels 11 in each display unit 1 are arranged in the above M×N matrix, a total number of the viewing areas 8 is also equal to M×N, and the viewing areas 8 are also arranged in an M×N matrix. Thus, when the user's eyes are located in each of two directions perpendicular to each other, the eyes can be respectively located in different viewing areas 8, and 360-degree rotating viewing can be realized.

In some embodiments, sub-pixels 11 located at a same relative position in all of the display units 1 correspond to a same viewing area 8.

Further, in the respective display units 1, the light emitted from the sub-pixels 11 located at the same relative position will be refracted to the same viewing area 8. For example, referring to FIG. 5, the light emitted from the sub-pixel 11 in the upper left corner of each display unit 1 is refracted to a same viewing area 8, and the light emitted from the second sub-pixel 11 from the left in the uppermost row of each display unit 1 is refracted to another same viewing area 8, and so on.

In some embodiments, the m sub-pixels 11 of a same display unit 1 have a same color; and all the sub-pixels 11 of the display device have at least two different colors, and may further have three different colors.

That is, the sub-pixels 11 may have different colors (e.g., the sub-pixels 11 may include red sub-pixels 11, green sub-pixels 11, and blue sub-pixels 11), so that the display device can realize color display. In the case of color display, considering uniformity and simplicity, it is advantageous that each display unit 1 has sub-pixels 11 of the same color, or it can be considered that the display unit 1 also has a "color". For example, in the rows, a red display unit 1, a green display unit 1, and a blue display unit 1 may be arranged in sequence; and arrangement orders of color of the display units 1 in different rows may be different.

In actual production, the light emitting layer 92 may be produced by an evaporation process, and each display unit 1 may correspond to an opening on a fine metal mask (FMM) to obtain the structure as shown in FIG. 4. Therefore, in the same display unit 1, the light emitting layer 92 corresponding to the multiple sub-pixels 11 has a one-piece structure and emits light of a same color; and different signals are loaded through the multiple independent anodes 91, so that the multiple sub-pixels 11 in the same display unit 1 emit light of different brightness (including emitting light and not emitting light).

In some embodiments, each refraction structure 5 is equivalent to a plano-convex lens 51, and a plane side of the equivalent plano-convex lens 51 faces (i.e., is proximal to) the display unit 1; light emitting surfaces 921 of all sub-pixels 11 of each display unit 1 are located in a focal plane of the plano-convex lens 51 equivalent to the refraction structure 5 corresponding to the display unit 1.

In other words, an optical effect of each refraction structure 5 should be equivalent to a plano-convex lens 51, and the plano-convex lens 51 refers to a lens with a convex arc surface on one side (i.e., a convex arc surface side) and a flat surface on the other side (i.e., the plane side).

It should be understood that "the refraction structure 5 is equivalent to the plano-convex lens 51" means that no matter what a form of the refraction structure 5 itself is, its optical effect is equal to that of the plano-convex lens 51. For example, the refraction structure 5 may specifically be an optical plano-convex lens 52, a diffractive plano-convex lens 53, etc., or may also be a liquid crystal lens, etc., which will be described in detail later.

Figure 6:
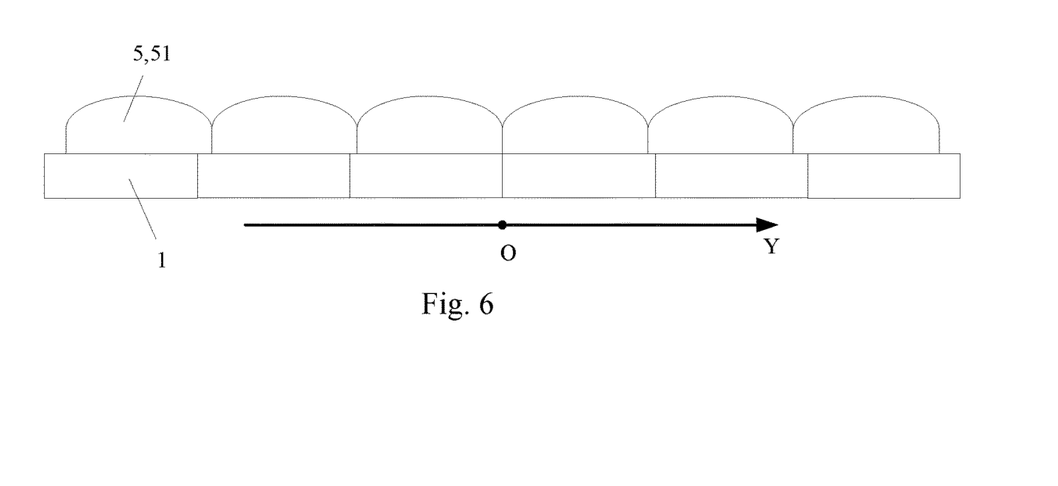
FIG. 6 is a partial cross-sectional view taken along a direction of the Y-axis showing a structure of another display device according to an embodiment of the present disclosure.

Of course, since the "plano-convex lens 51" can be equivalently obtained, the plano-convex lens 51 is directly shown in FIGS. 4, 6, etc. However, it should be understood that these drawings do not represent that the actual structure shown therein is a practical plano-convex lens 51.

It should be understood that a shape of an orthographic projection of the above equivalent plano-convex lens 51 on the reference plane parallel to the light emitting surfaces 921 of the sub-pixels 11 needs to match to a shape of an area occupied by the display unit 1. For example, referring to FIG. 5, if the display unit 1 occupies a rectangular area, the above equivalent plano-convex lens 51 should also occupy a rectangular area.

The structural design of the refraction structure 5 should ensure that the plane side of the equivalent plano-convex lens 51 faces (i.e., is proximal to) the display unit 1, and the light emitting surfaces 921 of the sub-pixels 11 of the display unit 1 are located in a focal plane (i.e., a focal surface) of the equivalent plano-convex lens 51.

The above "light emitting surface 921 of the sub-pixel 11" means that the light of the sub-pixel 11 can be regarded as emitted from the light emitting surface 921. For example, referring to FIG. 4, for each of the above sub-pixels 11 each including the OLED, the light emitting surface 921 may be a surface of the light emitting layer 92 of the OLED proximal to the light emitting side. Therefore, outside the light emitting surface 921, there are structures such as the cathode 93, the encapsulation layer 94, etc., and then the refraction structure 5 (equivalent to the plano-convex lens 51) is provided, but the light emitting surface 921 should still be located in the focal plane of the plano-convex lens 51.

Referring to FIG. 4, there are some electrodes (such as the cathode 93), the encapsulation layer 94 and other structures between the light emitting surface 921 and the refraction structure 5. Therefore, in order to ensure that the light emitting surface 921 is located at the focal plane of the equivalent plano-convex lens 51, a distance H between the uppermost end of the equivalent plano-convex lens 51 and the light emitting surface 921 and a focal length f of the plano-convex lens 51 should satisfy the following formula:

$$H = n_j f.$$

The $n_j$ is an equivalent refractive index of all the media (such as the cathode 93, the encapsulation layer 94, etc.) between the plano-convex lens 51 and the light emitting surface 921.

Based on properties of the plano-convex lens 51, the plano-convex lens 51 can refract light emitted from a same position of its focal plane (i.e., light emitted from a same position of the light emitting surface 921) to a same direction. Therefore, the above configuration can ensure that the equivalent plano-convex lens 51 refracts light from different sub-pixels 11 (i.e., light from different positions on the focal plane) to different viewing areas 8.

In some embodiments, the light emitting surfaces 921 of all the sub-pixels 11 are located in a same plane.

Referring to FIG. 4, in order to simplify the structure of the display panel, the light emitting surfaces 921 of all the sub-pixels 11 may be located in the same plane.

In some embodiments, the plane sides of all equivalent plano-convex lenses 51 are located in a same plane.

Referring to FIG. 4, in order to simplify the structure, the plane sides of the plano-convex lenses 51 equivalent to all the refraction structures 5 may also be located in the same plane.

In some embodiments, all the equivalent plano-convex lenses 51 have a same focal length.

To simplify the structure, the plano-convex lenses 51 equivalent to all the refraction structures 5 may have the same focal length.

The same plano-convex lens 51 has different refraction effects on light of different wavelengths, that is, the focal lengths for light of different wavelengths are different. Therefore, when the sub-pixels 11 in each display unit 1 are of the same color, the focal length and the focal plane of the plano-convex lens 51 equivalent to the refraction structure 5 of each display unit 1 should be specific to the color of the sub-pixels 11 in the display unit 1.

Specifically, the focal length f and a curvature radius R (referring to the curvature radius of the convex arc surface) of the plano-convex lens 51 satisfy the following formula:

$$R = (n_s - n_s') f.$$

The $n_s$ is a refractive index of the plano-convex lens 51 for light with a wavelength of s (for example, a wavelength of red light), and $n_s'$ is a refractive index of an environment medium (such as air) where the plano-convex lens 51 is located for the light with the wavelength of s.

It can be seen that, in order to ensure that the focal length f is the same, the curvature radiuses R of the equivalent plano-convex lenses 51 of the display units 1 corresponding to different colors may be different. For example, because refractive indices $n_R$, $n_G$, and $n_B$ of the plano-convex lenses 51 for red light, green light, and blue light satisfy $n_R < n_G < n_B$; curvatures $R_R$, $R_G$, and $R_B$ of the plano-convex lenses 51 respectively corresponding to the red light, green, and blue display units 1 should satisfy $R_R < R_G < R_B$.

In some embodiments, an orthographic projection of the display unit 1 on the reference plane parallel to the light emitting surface 921 of the sub-pixel 11 is a display projection, an orthographic projection of the sub-pixel 11 on the reference plane is a pixel projection, and an orthographic projection of the refraction structure 5 on the reference plane is a refraction projection;

a pattern formed by all display projections is symmetrical with respect to an X-axis and a Y-axis, respectively, and the X-axis and the Y-axis are located in the reference plane and perpendicular to each other;

a pattern formed by all refraction projections is symmetrical with respect to the X-axis and the Y-axis, respectively;

a pattern formed by all the pixel projections in each display projection is symmetrical with respect to a direction parallel to the X-axis and a direction parallel to the Y-axis, respectively;

except for a display projection whose geometric center is on the Y-axis, along a direction of the X-axis, geometric centers of other display projections are farther away from the Y-axis than geometric centers of their corresponding refraction projections; and except for a display projection whose geometric center is on the X-axis, along a direction of the Y-axis, geometric centers of other display projections are farther away from the X-axis than geometric centers of their corresponding refraction projections.

As mentioned above, when the refraction structure 5 is equivalent to the plano-convex lens 51, if the focal lengths of respective equivalent plano-convex lenses 51 are the same and relative positions of the equivalent plano-convex lenses 51 to corresponding display units 1 are the same, the plano-convex lenses 51 will emit light from the same relative position in different display units 1 to multiple directions parallel to each other, but cannot make these light all enter into one viewing area 8.

Figure 5:
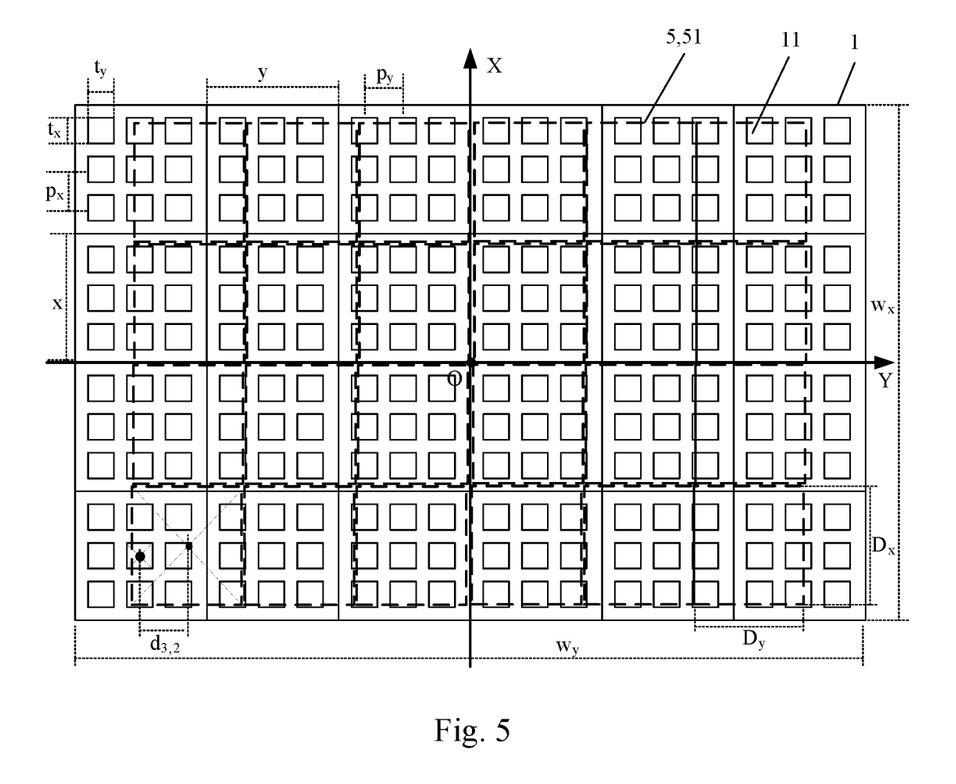
FIG. 5 is a top view showing a structure of another display device according to an embodiment of the present disclosure.

Therefore, referring to FIG. 5, all the display units 1 and the refraction structures 5 are arranged in an axially symmetric manner; that is, all the display units 1 are symmetrical with respect to the X-axis and the Y-axis, respectively, and all the refraction structures 5 are also symmetrical with respect to the X-axis and the Y-axis, respectively. At the same time, the sub-pixels 11 in each display unit 1 are also axisymmetric with respect to two directions parallel to the X-axis and the Y-axis, respectively (but not necessarily with respect to the X-axis and the Y-axis).

Further, in the directions of the X-axis and the Y-axis, a center of each refraction projection is closer to a corresponding axis of symmetry than that of a corresponding display projection.

In other words, referring to FIGS. 5 and 6, a display structure and its equivalent plano-convex lens 51 should be closer to the center of symmetry O (i.e., an intersection of the X-axis and the Y-axis) than the corresponding display unit 1. Therefore, except for the display unit 1 located at the center of symmetry O, each of the other display units 1 and its corresponding plano-convex lens 51 are "relatively offset", and the corresponding plano-convex lens 51 is more closer to the center of symmetry O than the display unit 1.

Through this "relative offset" between the plano-convex lens 51 and its corresponding display unit 1, each plano-convex lens 51 can refract light of each sub-pixel 11 in the corresponding display unit 1 to the desired viewing area 8.

It should be understood that since FIG. 5 is a top view, a position distribution of respective structures is equivalent to a position distribution of orthographic projections of the structures on the reference plane; at the same time, because the refraction structures 5 are actually located in front of the respective display units 1 to "block" the respective display units 1, the refraction structures 5 in FIG. 5 are represented by dotted lines.

In some embodiments, each of the display projections is a rectangle having a first edge parallel to the X-axis and a second edge parallel to the Y-axis, and the respective display projections are arranged closely;

each of the refraction projections is a rectangle having a third edge parallel to the X-axis and a fourth edge parallel to the Y-axis, and the respective refraction projections are arranged closely; and a length of the first edge of the display projection is greater than a length of a third edge of a refraction projection corresponding to the display projection, and a length of the second edge of the display projection is greater than a length of a fourth edge of the refraction projection corresponding to the display projection.

That is to say, referring to FIGS. 5 and 6, both the refraction structures 5 and the display units 1 may be rectangular, and arranged closely without gaps, and each refraction structure 5 is "smaller" than its corresponding display unit 1. In other words, a size of an aperture of each equivalent plano-convex lens 51 is smaller than that of its corresponding display unit 1, that is, the equivalent plano-convex lens 51 has a "shrank aperture".

Referring to FIGS. 5 and 6, according to the above conditions, when the refraction structure 5 located at the center of symmetry O is aligned with the corresponding display unit 1 at one edge, the other refraction structures 5 will naturally be closer to the center of symmetry O in both the X-axis direction and the Y-axis direction than their corresponding display units 1; and as the distance from the center of symmetry is farther, the position deviation (i.e., position offset or position shift) between the refraction structure 5 and its corresponding display unit 1 is greater.

According to the above configuration, the arrangements of the refraction structures 5 and the display units 1 can be easily realized to meet the above requirements.

The dimensions of the display unit 1, the sub-pixel 11, the equivalent plano-convex lens 51, etc., in a display device that meets the requirements of the above embodiments are exemplarily analyzed below.

Referring to FIG. 5, each display unit 1 is a rectangle, and the two adjacent edges of the rectangle are parallel to the X-axis and the Y-axis, respectively; the plurality of display units 1 are arranged in a matrix (or an array), and the column direction and row direction of the array are parallel to the X-axis and Y-axis, respectively; and the entire matrix is symmetrical with respect to the X-axis and Y-axis, respectively. Thus, the center of symmetry O is also the geometric center of the matrix of all the display units 1.

Each display unit 1 has M×N=m sub-pixels 11 arranged in a matrix; wherein along the Y-axis direction, each row in each display unit 1 has M sub-pixels 11; and along the X-axis direction, each row in each display unit 1 has N sub-pixels 11. The matrix of sub-pixels 11 in each display unit 1 as a whole is axisymmetric with respect to the direction parallel to the X-axis and the direction parallel to the Y-axis, respectively. Correspondingly, the display device has a total of M×N viewing areas 8 arranged in a matrix.

The refraction structures 5 (i.e., the plano-convex lenses 51) are also rectangular and arranged in a matrix which is axisymmetric in the above manner; and the rectangle of each of the refraction structures 5 is smaller than that of the corresponding display unit 1.

A total size of all display units 1 (i.e., the size of the display area of the display panel) in the X-axis direction is $w_x$, and a total size of all display units 1 in the Y-axis direction is $w_y$; a size of each display unit 1 in the X-axis direction is x, and a size of each display unit 1 in the Y-axis direction is y; a size of each sub-pixel 11 (i.e., a pitch) in the X-axis direction is $p_x$, and a size of each sub-pixel 11 (i.e., the pitch) in the Y-axis direction is $p_y$; and in each sub-pixel 11, an actual light emitting area (e.g., an area where the above OLED is formed) has a size $t_x$ in the X-axis direction and a size $t_y$ in the Y-axis direction. The aperture (size) of the plano-convex lens 51 equivalent to the refraction structure 5 is $D_x$ in the X-axis direction and $D_y$ in the Y-axis direction.

Figure 7:
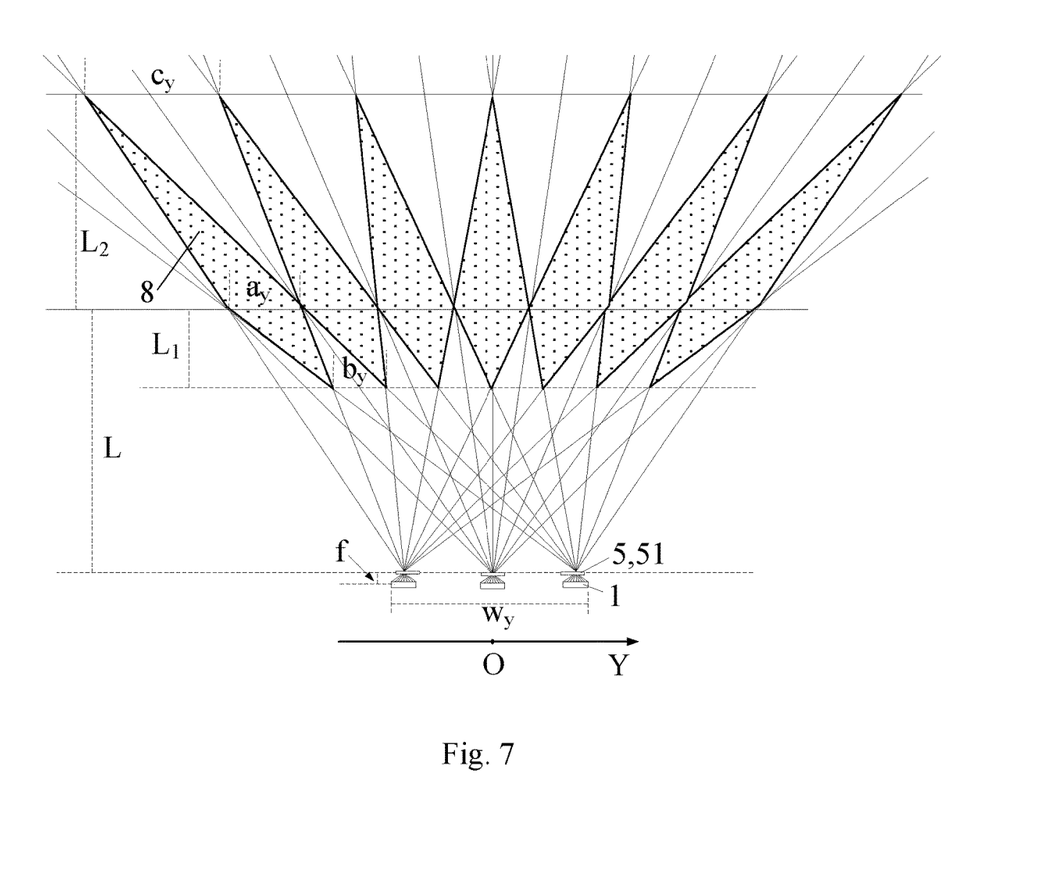
FIG. 7 is a schematic diagram of the correspondence between light emitted from sub-pixels and viewing areas in another display device according to an embodiment of the present disclosure.

Referring to FIG. 7, in a cross section parallel to the Y-axis and perpendicular to the light emitting surface 921 of the sub-pixel 11, M viewing areas 8 (shown as pitted areas in the figure) are formed.

For the sake of simplicity, FIG. 7 only shows light emitted from sub-pixels 11 in the two display units 1 located at both ends and light emitted from sub-pixels 11 in the one display unit 1 located in the middle.

At the same time, the number of viewing areas 8 in FIG. 7 does not exactly correspond to the number of sub-pixels 11 in FIG. 5. This is to clearly show the sub-pixels 11 in FIG. 5 and avoid the sub-pixels 11 from being too small.

Referring to FIG. 7, light in each viewing area 8 comes from the sub-pixels 11 arranged in the same relative position in respective display units 1. For example, the light emitted from the leftmost sub-pixel 11 in each display unit 1 is refracted to the rightmost viewing area 8, and the light emitted from the rightmost sub-pixel 11 in each display unit 1 is refracted to the leftmost viewing area 8.

It can be seen that a distance between a portion, which has a largest width, of each viewing area 8 (i.e., a position where adjacent viewing areas 8 contact each other) and the display device is an optimal viewing distance L, a closest (or smallest) viewing distance is smaller than the optimal viewing distance L by $L_1$, and a farthest (or largest) viewing distance is larger than the optimal viewing distance L by $L_2$.

Further, a width of each viewing area 8 at the optimal viewing distance L is $a_y$, a distance between any two adjacent viewing areas 8 at the closest viewing distance is $b_y$, and a distance between any two adjacent viewing areas 8 at the farthest viewing distance is $c_y$.

It is advantageous that the above distances and the user's interpupillary distance e satisfy the following formulas:

$$a_y \le e \quad (1);$$

$$(M-1)b_y \ge e \quad (2);$$

and $$c_y \le e \quad (3).$$

The formula (1) is to ensure that at the optimal viewing distance L, the user's eyes will not be in a same viewing area 8 at the same time; that is, the user's eyes will always be in different viewing areas 8, respectively.

The formula (3) means that at the farthest viewing distance, the distance $c_y$ between any two viewing areas 8 is smaller than the interpupillary distance. Therefore, when one eye of the user is located in one viewing area 8, the other eye of the user may enter other viewing area 8, rather than "not reaching" the other viewing area 8.

It can be seen from FIG. 7 that $b_y$ must be smaller than $c_y$, so formula (2) means that at the closest viewing distance, when one eye of the user is in one viewing area 8, the other eye is still in an range where a viewing area 8 may exist, rather than "beyond the range where a viewing area 8 may exist".

Further, referring to FIG. 7, the above viewing areas 8 are obtained by refracting the light emitted from each sub-pixel 11 by the corresponding plano-convex lens 51 with the focal length of f. Therefore, according to known triangular relationships, the following formulas can be further obtained:

$$\frac{a_y}{t_y} = \frac{L}{f}; \frac{a_y}{w_y} = \frac{L_1}{L-L_1} = \frac{L_2}{L+L_2}; \frac{b_y}{w_y} = \frac{L_1}{L}; \text{ and } \frac{c_y}{w_y} = \frac{L_2}{L}.$$

Based on the above formulas, the following formulas can be obtained:

$$a_y = \frac{Lt_y}{f}; L_1 = \frac{a_y L}{w_y + a_y}; L_2 = \frac{a_y L}{w_y - a_y}; b_y = \frac{w_y a_y}{w_y + a_y}; \text{ and}$$

$$c_y = \frac{w_y a_y}{w_y - a_y}.$$

Further, on the basis of the center of symmetry O, in the k-th display unit 1 located on either side of the center of symmetry O, the light emitted from the center of the i-th (i is a positive integer less than or equal to M) sub-pixel 11 from the right should be refracted to the center of the (M+1)−i-th viewing area 8 from the right, and the Y-axis coordinate value of the viewing area 8 (by having the above center of symmetry O as the origin) is:

$$[i-(M+1)/2]a_y.$$

The above coordinate value may be a negative value, which means that the viewing area 8 may be located on the left side of the origin (i.e., the center of symmetry O).

Meanwhile, in the above k-th display unit 1, the distance between the center of the i-th sub-pixel 11 and the center of its corresponding equivalent plano-convex lens 51 is $d_{k,i}$.

As shown in FIG. 5, taking k=3 and i=2 as an example, the distance $d_{3,2}$ along the Y-axis direction is shown. It should be understood that the other $d_{k,i}$ may be determined in the same way.

Therefore, referring to FIG. 7, according to known triangular relationships, the following formulas can be obtained:

$$\frac{d_{k,i}}{f} = \frac{kD_y - [i - (M+1)/2]a_y}{L}; \text{ and } \frac{t_y}{a_y} = \frac{f}{L}.$$

Based on these formulas, the following can be obtained:

$$d_{k,i} = \frac{kD_y t_y}{a_y} - [i - (M+1)/2]t_y.$$

Further, referring to FIG. 7, the light emitted from the two sides of the above i-th sub-pixel 11 should also be refracted to the two sides of the above (M+1)−i-th viewing area 8, respectively, so a further formula can be obtained:

$$ky + \frac{M+1-2i}{2}p_y - \frac{t_y}{2} < kD_y + d_{k,i} < ky + \frac{M+1-2i}{2}p_y + \frac{t_y}{2}.$$

After further conversion, the following formula can be obtained:

$$\frac{ya_y}{a_y+p_y} - \frac{a_y t_y}{2k(a_y+p_y)} < D_y < \frac{ya_y}{a_y+p_y} + \frac{a_y t_y}{2k(a_y+p_y)}.$$

Therefore, the optimal size of the aperture $D_y$ of each equivalent plano-convex lens 51 in the Y-axis direction can be calculated as:

$$D_y = \frac{ya_y}{a_y+p_y}; \quad (4)$$

and
a fluctuation range of the size $D_y$ is:

$$\pm \frac{a_y t_y}{2k(a_y+p_y)}. \quad (5)$$

In other words, according to the sizes of the display unit 1 and the sub-pixel 11, the refraction structure 5 can be designed according to the above formulas, so that the aperture $D_y$ of the equivalent plano-convex lens 51 in the Y-axis direction meets the requirements of the above formulas (4) and (5).

Meanwhile, it can be further determined that a 3D viewing angle range in the Y-axis direction (i.e., an angle between two outer sides of the two outermost viewing areas) satisfies the following formula (6):

$$\omega_y = 2\arctan\frac{Mp_y}{2f}. \quad (6)$$

Of course, it should be understood that based on the same principle, all relationships in the X-axis direction satisfied by all the structures correspond to the above formulas (1) to (6), except that in the above formulas (1) to (6) all parameter y should be replaced by parameter x, and all parameter M should be replaced by parameter N, which will not be described in detail here.

For example, in a display device of an embodiment of the present disclosure, some parameters may be set as shown in the following table.

TABLE 1 design values of some parameters of the display device of the embodiment of the present disclosure

| M × N | $w_x \times w_y$ (mm) | x × y (μm) | $p_x \times p_y$ (μm) |
|---|---|---|---|
| 4 × 4 | 59 × 104 | 36.6 × 54.9 | 5.15 × 9.72 |
| $t_x \times t_y$ (μm) | f (μm) | n (it is considered that only for one wavelength of light, and the refractive index of the environmental medium is 1) | L (mm) |
| 5.15 × 9.72 | 76.58 | 1.49 | 350 |

The focal length f is determined according to the following method: the size y of the light emitting area of the above sub-pixel 11 is 54.9 μm, and corresponding to the size, the minimum focal length f of the plano-convex lens 51 that can be achieved in the process is 76.58 μm.

Therefore, according to the above formulas (1) to (6), the parameters of part of the structures can be further calculated as shown in the following table.

TABLE 2 calculated values of some parameters of the display device of the embodiment of the present disclosure

| $a_y \times a_x$ (mm) | $L_1$ (mm) | $L_2$ (mm) | $b_x \times b_y$ (mm) |
|---|---|---|---|
| 44.44 × 23.54 | 104.79 | 261.19 | 16.82 × 31.14 |
| $c_x \times c_y$ (mm) | $D_x \times D_y$ (μm) | $\omega_y \times \omega_x$ | the total size of the viewing areas at the optimal viewing distance (mm) |
| 39.16 × 77.61 | 54.888 × 36.592 | 15.32° × 28.5° | 177.8 × 94.15 |

In the above table, the distance between any two adjacent viewing areas 8 at the farthest viewing distance is 77.61 mm, which is greater than the usual interpupillary distance. This shows that at a farthest viewing distance corresponding to the above $L_2$ which is 261.19 mm, the user's eyes usually cannot be in different viewing areas 8, respectively, at the same time.

Therefore, recalculation is performed with the conventional interpupillary distance of 60 mm, and it can be determined that the $L_2$, which corresponds to the farthest viewing distance that is feasible in practical applications (i.e., 3D display can be realized), should be 218.79 mm.

In some embodiments, each refraction structure 5 is an optical plano-convex lens 52 made of a transparent material. The optical plano-convex lens 52 has a plane side and a convex arc side arranged oppositely, and the plane side is proximal to the display unit 1.

Figure 8:
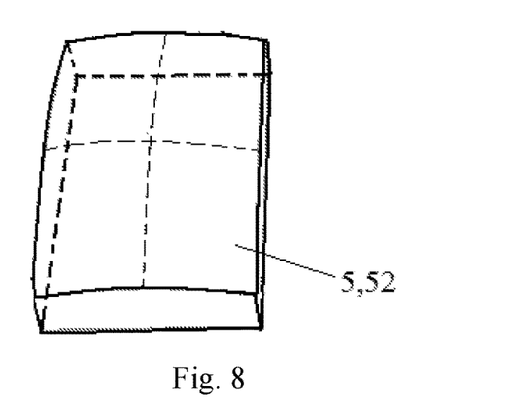
FIG. 8 is a schematic perspective diagram showing a structure of an optical plano-convex lens in another display device according to an embodiment of the present disclosure.

In other words, referring to FIG. 8, a transparent material with a certain refractive index may be used to form a solid optical plano-convex lens 52 with a convex arc surface on one side and a flat surface on the other side as the above refraction structure 5.

It should be understood that, each parameter value (such as aperture, radius of curvature, etc.) of the structure of each solid optical plano-convex lens 52 should be directly equal to a corresponding parameter value of the structure of the above-described equivalent plano-convex lens 51. For example, the actual plane sides of optical plano-convex lenses 52 may be located in a same plane, and this plane may directly contact a surface of the light emitting side of the display panel (such as a surface of the encapsulation layer 94 distal to the base substrate 9).

In some embodiments, each refraction structure 5 is a diffractive plano-convex lens 53 made of a transparent material, such as a Fresnel lens. The diffractive plano-convex lens 53 has a plane side and a diffractive structure side arranged oppositely, and the plane side is proximal to the corresponding display unit 1.

Figure 9:
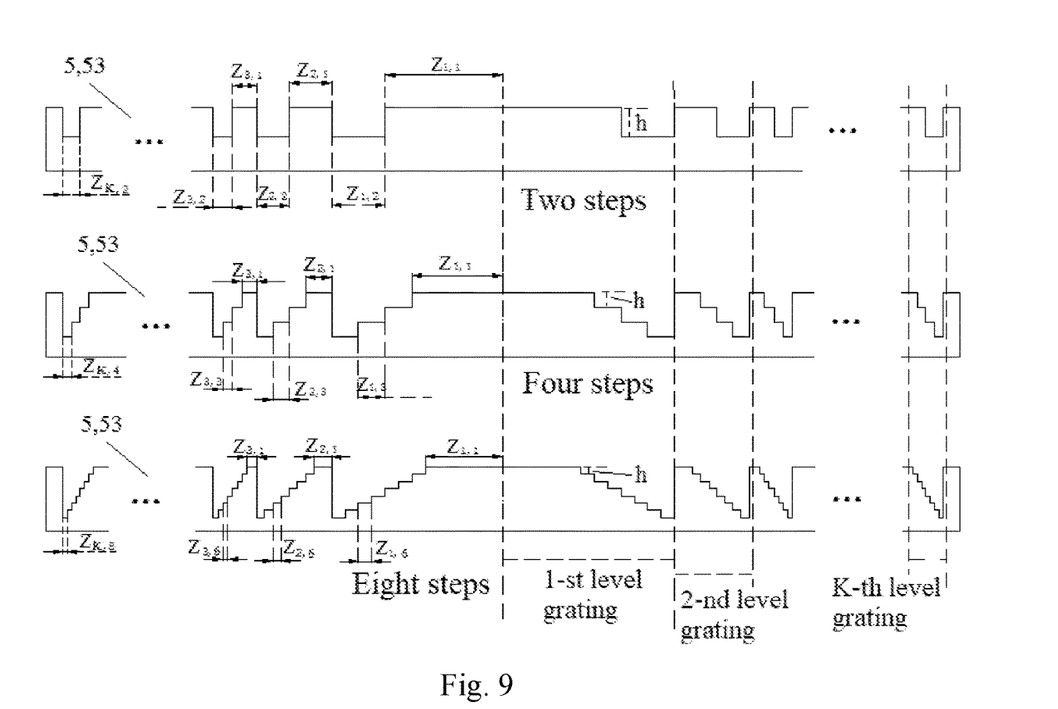
FIG. 9 is a partial cross-sectional view showing structures of several diffractive plano-convex lenses with different numbers of steps in another display device according to an embodiment of the present disclosure.

In other words, referring to FIG. 9, a solid diffractive plano-convex lens 53 may also be used as the above refraction structure 5. One side of the diffractive plano-convex lens 53 is a plane, and the other side is provided with a diffractive structure. The diffractive structure can cause light to diffract and change a propagation direction of the light. By designing a specific diffractive structure, the diffraction effect thereof can be equal to that of a convex arc surface. That is, by making diffractive structures equivalent to different convex arc surfaces, diffractive plano-convex lenses 53 can be made equivalent to different plano-convex lenses 51.

The actual plane sides of diffractive plano-convex lenses 53 may be located in a same plane, and the plane may directly contact the surface of the light emitting side of the display panel (such as the surface of the encapsulation layer 94 distal to the base substrate 9).

Specifically, the diffractive structure can be divided into ring-shaped gratings with K levels (K is an integer greater than or equal to 2) as shown in FIG. 9; and K is determined by the maximum aperture of the diffractive plano-convex lens 53, and an outer grating has a higher order.

Each grating includes $P=2^g$ steps, and g is a positive integer, so the number of steps P in each grating may be the same, which may be 2, 4, 8, 16, etc. That is, the corresponding diffractive plano-convex lens 53 may be of "two steps", "four steps", "eight steps", "sixteen steps", etc. In FIG. 9, diffractive plano-convex lenses 53 with "two steps", "four steps", and "eight steps", respectively, are shown as examples.

The above-mentioned number P of steps is greater, the function of the diffractive structure is closer to the convex arc surface, and the processing difficulty thereof is greater, so an appropriate P may be selected according to the processing difficulty.

It is determined that a phase difference between light at any two adjacent steps is $2\pi/P$.

A height h of each step is the same, which is determined by a refractive index of the diffractive plano-convex lens 53 for light to be refracted. For example, for light with a wavelength of s, the height h of each step should satisfy the following formula:

$$h = \frac{\lambda}{(n_s - n'_s)P}.$$

The $n_s$ is a refractive index of the diffractive plano-convex lens 53 for light with a wavelength of s (e.g., a wavelength of red light), and $n_s'$ is a refractive index of an environment medium (such as air) where the diffractive plano-convex lens 53 is located for the light with the wavelength of s.

As mentioned above, the refractive indices $n_R$, $n_G$ and $n_B$ of the diffractive plano-convex lenses 53 for red light, green light and blue light satisfy $n_R < n_G < n_B$; and therefore, the step heights $h_R$, $h_G$ and $h_B$ in the diffractive plano-convex lenses 53 corresponding to the red display unit 1, green display unit 1 and blue display unit 1 should satisfy $h_R > R_G > R_B$.

Figure 10:
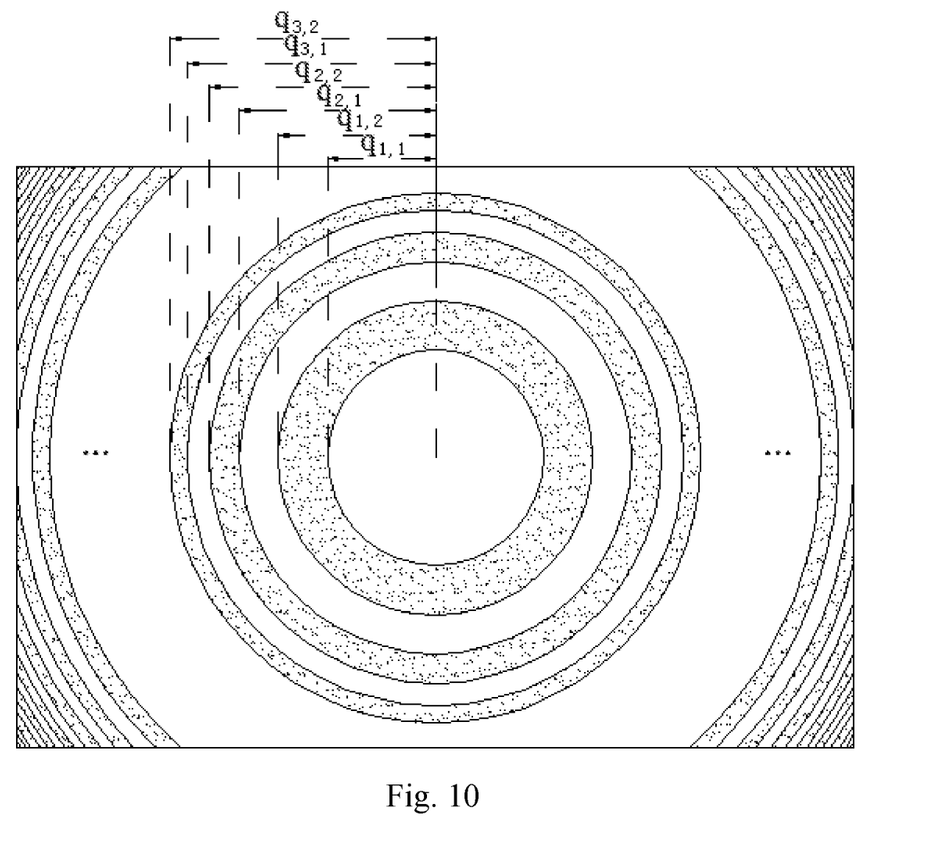
FIG. 10 is a partial top view showing a structure of a two-step diffractive plano-convex lens in another display device according to an embodiment of the present disclosure.

Referring to FIG. 10 (in which the diffractive plano-convex lens 53 with "two steps" is taken as an example), a radius of an outer circle of the v-th (where v is a positive integer less than or equal to P) step counted from the inside to the outside in the u-th (where u is a positive integer less than or equal to K) level grating is $q_{u,v}$.

In FIG. 10, each ring (including a hollow ring or a filled ring) is a surface of a step, and it should be understood that the steps therein belong to multiple gratings of different levels, respectively.

Obviously, a width $Z_{u,v}$ of the v-th step counted from the inside to the outside in the u-th level grating is a difference between the radiuses of outer circles of two adjacent rings, namely:

$$Z_{u,v} = q_{u,v} - q_{u,v-1}.$$

In addition, the above radius $q_{u,v}$ of the outer circle, the focal length f of the diffractive plano-convex lens 53, and the wavelength $\lambda$, also satisfy the following formula:

$$q_{u,v} = \sqrt{\left[f + \left(u - 1 + \frac{v}{P}\right)\lambda\right]^2 - f^2} = \sqrt{\left[\left(u - 1 + \frac{v}{P}\right)\lambda\right]^2 + 2\left(u - 1 + \frac{v}{P}\right)\lambda f}.$$

Therefore, the width $q_{u,v}$ of each step can be calculated. Obviously, according to the above formulas, the outer step has a smaller width, or the higher order (or level) grating has a smaller width.

Since wavelengths $\lambda_R$, $\lambda_G$ and $\lambda_B$ of red light, green light and blue light satisfy $\lambda_R > \lambda_G > \lambda_B$, in the diffractive plano-convex lenses 53 corresponding to the red display unit 1, green display unit 1 and blue display unit 1, the widths of a step in a same order in respective gratings of a same level also gradually decrease.

Figure 12:
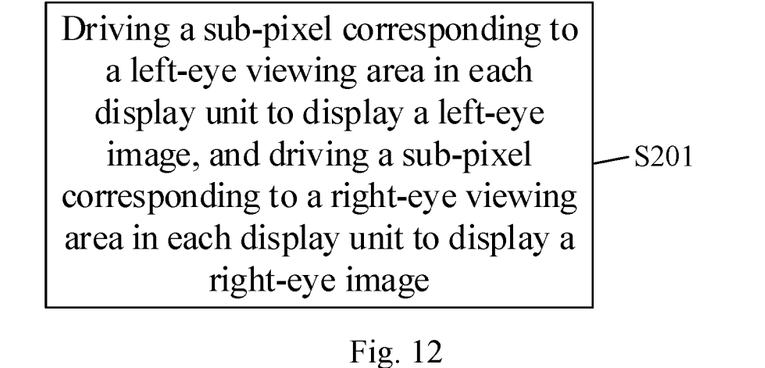
FIG. 12 is a flowchart of a driving method of a display device according to an embodiment of the present disclosure.

In the second aspect, referring to FIG. 12, an embodiment of the present disclosure provides a driving method of the above-described display device.

The driving method is used for driving the above-described display device to realize naked eye 3D display.

The driving method of the embodiment of the present disclosure may include the following step S201.

In step S201, driving a sub-pixel corresponding to a left-eye viewing area in each display unit to display a left-eye image, and driving a sub-pixel corresponding to a right-eye viewing area in each display unit to display a right-eye image.

The left-eye viewing area is a viewing area where a left eye of a user is located, and the right-eye viewing area is a viewing area where a right eye of the user is located.

When the above display device is used for the naked-eye 3D display, the viewing area where the user's left eye is currently located may be determined as the left-eye viewing area, and the viewing area where the user's right eye is currently located may be determined as the right-eye viewing area; and the sub-pixels corresponding to the two viewing areas in each display unit are driven to display the left-eye image and the right-eye image, respectively, so that the user's eyes can see the required images (i.e., the left-eye image and right-eye image), respectively, and feel the stereoscopic effect.

When the display device includes the above position detector and controller, the specific positions of the user's eyes may be determined according to a detection result of the position detector, and then two specific viewing areas are determined as the left-eye viewing area and the right-eye viewing area, respectively.

It is alternatively possible to pre-set viewing positions to ensure that some viewing areas must correspond to the user's left eye, and other viewing areas must correspond to the user's right eye, so that all the viewing areas that must correspond to the user's left eye are preset as the left-eye viewing areas, and all the viewing areas that must correspond to the user's right eye are preset as the right-eye viewing areas.

The display device may be watched by only one user; that is, there is one left-eye viewing area and one right-eye viewing area only at the same time.

The display device may alternatively be watched by multiple users at the same time; that is, there are multiple "pairs" of left-eye viewing area and right-eye viewing area at the same time. Further, images displayed in the viewing areas for different users to watch may be the same or different; that is, multiple users may see the same content or different contents.

When only part of the viewing areas are the left-eye viewing area and the right-eye viewing area, the sub-pixels corresponding to the remaining viewing areas in each display unit may be turned off or may still display.

Figure 13:
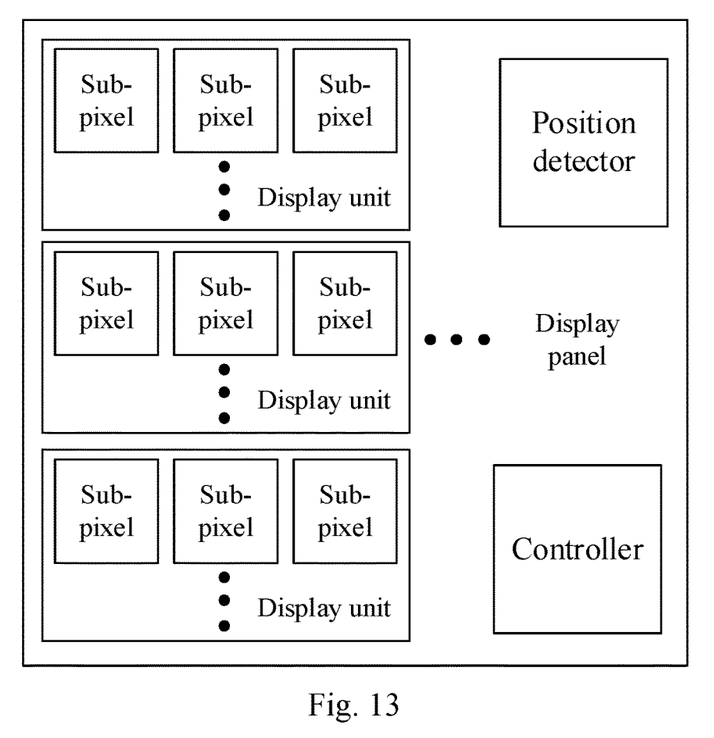
FIG. 13 is a block diagram showing components of a display panel according to an embodiment of the present disclosure.

In the third aspect, referring to FIG. 13, an embodiment of the present disclosure provides a display panel including the plurality of display units arranged in the array in the above-described display device.

That is, the above plurality of display units may be arranged in a display panel, so that the display panel of the embodiment of the present disclosure includes a plurality of sub-pixels, and these sub-pixels form the above display units arranged in the array.

The above controller and position detector may also be included in the display panel.

Therefore, when the display panel of the embodiment of the present disclosure is combined with the above refraction structure (such as a refraction substrate), the naked-eye 3D display can be realized.

Figure 14:
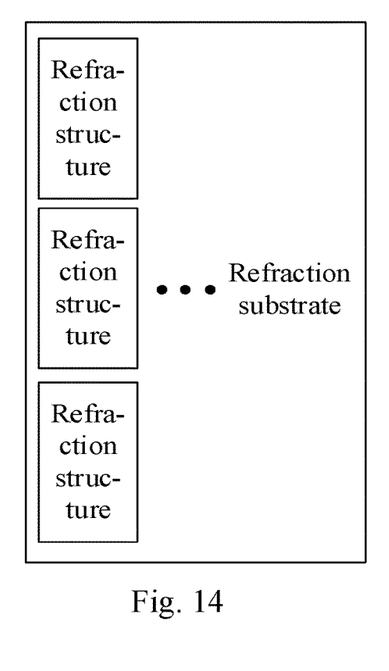
FIG. 14 is a block diagram showing components of a refraction substrate according to an embodiment of the present disclosure.

In the fourth aspect, referring to FIG. 14, an embodiment of the present disclosure provides a refraction substrate, which includes a plurality of refraction structures in the above-mentioned display device.

That is, the plurality of refraction structures in the above display device may be formed into an independent plate-shaped device (i.e., the refraction substrate), so that by providing the refraction substrate of the embodiment of the present disclosure outside the above display panel, the naked-eye 3D display can be realized.

The present disclosure has disclosed example embodiments, and although specific terms are adopted, they are used and should only be interpreted as general descriptive meanings, and are not used for a purpose of limitation. In some instances, it is obvious to those skilled in the art that, unless expressly indicated otherwise, the features, characteristics, and/or elements described in combination with a specific embodiment can be used alone, or can be used in combination with features, characteristics, and/or elements described in combination with other embodiments. Therefore, those skilled in the art would understand that various changes in form and details can be made without departing from the scope of the present disclosure as set forth by the appended claims.

The invention claimed is:

1. A display device, comprising:
a plurality of display units arranged in an array, wherein each display unit comprises m sub-pixels, the m sub-pixels of the display unit are in one-to-one correspondence with m preset viewing areas, and m is an integer greater than or equal to 2; and
refraction structures in one-to-one correspondence with the plurality of display units, each refraction structure is located on a light emitting side of a display unit corresponding to the refraction structure, and the refraction structure is configured to refract light emitted from each sub-pixel of a corresponding display unit to a viewing area corresponding to the sub-pixel;
wherein each refraction structure is equivalent to a plano-convex lens, and a plane side of the equivalent plano-convex lens is proximal to the display units; and
light emitting surfaces of all sub-pixels of each display unit are located in a focal plane of the plano-convex lens equivalent to the refraction structure corresponding to the display unit.

2. The display device of claim 1, wherein
the m sub-pixels of each display unit are arranged in an array, and sub-pixels of any two display units are arranged in a same way.

3. The display device of claim 2, wherein
the m sub-pixels of each display unit are arranged in an M×N matrix, where M is an integer greater than or equal to 2, and N is an integer greater than or equal to 2.

4. The display device of claim 2, wherein
orthographic projections of the viewing areas on a reference plane parallel to a light emitting surface of each sub-pixel are arranged in an array, and an arrangement of the orthographic projections is the same as an arrangement of the sub-pixels of each display unit.

5. The display device of claim 2, wherein
sub-pixels located at a same relative position in all of the plurality of display units correspond to a same viewing area.

6. The display device of claim 1, wherein
light emitting surfaces of all sub-pixels are located in a same plane.

7. The display device of claim 1, wherein
plane sides of all equivalent plano-convex lenses are located in a same plane.

8. The display device of claim 1, wherein
all equivalent plano-convex lenses have a same focal length.

9. The display device of claim 1, wherein
orthographic projections of the display units on a reference plane parallel to the light emitting surfaces of the sub-pixels are display projections, orthographic projections of the sub-pixels on the reference plane are pixel projections, and orthographic projections of the refraction structures on the reference plane are refraction projections;
a pattern formed by all display projections is symmetrical with respect to an X-axis and a Y-axis, respectively, and the X-axis and the Y-axis are located in the reference plane and perpendicular to each other;
a pattern formed by all refraction projections is symmetrical with respect to the X-axis and the Y-axis, respectively;
a pattern formed by all pixel projections in each display projection is symmetrical with respect to a direction parallel to the X-axis and a direction parallel to the Y-axis, respectively;
except for each display projection whose geometric center is on the Y-axis, along a direction of the X-axis, geometric centers of other display projections are farther away from the Y-axis than geometric centers of their corresponding refraction projections; and
except for each display projection whose geometric center is on the X-axis, along a direction of the Y-axis, geometric centers of other display projections are farther away from the X-axis than geometric centers of their corresponding refraction projections.

10. The display device of claim 9, wherein
each display projection is a rectangle having a first edge parallel to the X-axis and a second edge parallel to the Y-axis, and the display projections are arranged closely;
each refraction projection is a rectangle having a third edge parallel to the X-axis and a fourth edge parallel to the Y-axis, and the refraction projections are arranged closely; and
a length of the first edge of the display projection is greater than a length of a third edge of the refraction projection corresponding to the display projection, and a length of the second edge of the display projection is greater than a length of the fourth edge of the refraction projection corresponding to the display projection.

11. The display device of claim 1, wherein
each refraction structure is an optical plano-convex lens made of a transparent material, the optical plano-convex lens has a plane side and a convex arc side arranged oppositely, and the plane side is proximal to the display units.

12. The display device of claim 1, wherein
each refraction structure is a diffractive plano-convex lens made of a transparent material, the diffractive plano-convex lens has a plane side and a diffractive structure side arranged oppositely, and the plane side is proximal to the display units.

13. The display device of claim 1, wherein
them sub-pixels of a same display unit have a same color; and
all sub-pixels have at least two different colors.

14. The display device of claim 1, wherein
each sub-pixel comprises a light emitting device.

15. The display device of claim 1, further comprising:
a position detector configured to detect a position of a user's eye; and
a controller configured to determine a viewing area where the user's eye is located according to the position of the user's eye, and control a sub-pixel, which corresponds to the viewing area, of a respective display unit to display.

16. A driving method of a display device, the display device being the display device of claim 1, the driving method comprising:
driving a sub-pixel corresponding to a left-eye viewing area in each of the plurality of display units to display a left-eye image, and driving a sub-pixel corresponding to a right-eye viewing area in the each of the plurality of display units to display a right-eye image; wherein the left-eye viewing area is a viewing area where a left eye of a user is located, and the right-eye viewing area is a viewing area where a right eye of the user is located.

* * * * *